United States Patent
Oskouy et al.

(10) Patent No.: US 7,801,140 B2
(45) Date of Patent: Sep. 21, 2010

(54) IN-LINE PACKET PROCESSING

(75) Inventors: Rasoul Mirzazadeh Oskouy, Fremont, CA (US); Dennis C. Ferguson, Mountain View, CA (US); Hann-Hwan Ju, San Jose, CA (US); Raymond Marcelino Manese Lim, Mountain View, CA (US); Pradeep S. Sindhu, Mountain View, CA (US); Sreeram Veeragandham, Sunnyvale, CA (US); Jeff Zimmer, Scotts Valley, CA (US); Michael M. Y. Hui, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 331 days.

(21) Appl. No.: 11/842,110

(22) Filed: Aug. 20, 2007

(65) Prior Publication Data

US 2008/0031252 A1  Feb. 7, 2008

Related U.S. Application Data

(63) Continuation of application No. 11/682,111, filed on Mar. 5, 2007, which is a continuation of application No. 10/081,048, filed on Feb. 20, 2002, now Pat. No. 7,209,448, which is a continuation of application No. 09/129,137, filed on Aug. 4, 1998, now Pat. No. 6,791,947.

(51) Int. Cl.
*H04L 12/56* (2006.01)

(52) U.S. Cl. .................. 370/392; 370/229; 370/235.1; 370/473; 370/474

(58) Field of Classification Search ............. 370/392, 370/229, 235.1, 473, 474
See application file for complete search history.

(56) References Cited

U.S. PATENT DOCUMENTS

| | | | |
|---|---|---|---|
| 4,755,986 A | 7/1988 | Hirata | |
| 4,799,215 A | 1/1989 | Suzuki | |
| 5,025,458 A | 6/1991 | Casper et al. | |
| 5,126,999 A | 6/1992 | Munter et al. | |
| 5,166,674 A | 11/1992 | Baum et al. | |
| 5,249,292 A | 9/1993 | Chiappa | |
| 5,408,469 A | 4/1995 | Opher et al. | |
| 5,412,648 A | 5/1995 | Fan | |
| 5,430,727 A | 7/1995 | Callon | |
| 5,463,762 A | 10/1995 | Morrissey et al. | |

(Continued)

OTHER PUBLICATIONS

Kaiserswerth, M., "The Parallel Protocol Engine", IEEE ACM Transactions on Networking, US, IEEE Inc., New York, vol. 1, No. 6, Dec. 1, 1993, pp. 650-663, XP000430135, ISSN: 1063-6692.

(Continued)

*Primary Examiner*—Pankaj Kumar
*Assistant Examiner*—Lonnie Sweet
(74) *Attorney, Agent, or Firm*—Harrity & Harrity, LLP

(57) ABSTRACT

A method and device for in-line processing a data packet is provided. The data packet is received at a first buffer. The data packet is divided into a number of cells that are stored in a first queue. For each cell, a cell state code is stored that indicates an address of the corresponding cell in the first queue and an indication of a sequence order of the cell within the data packet.

14 Claims, 11 Drawing Sheets

U.S. PATENT DOCUMENTS

| | | | |
|---|---|---|---|
| 5,469,432 A | 11/1995 | Gat | |
| 5,487,061 A | 1/1996 | Bray | |
| 5,530,806 A | 6/1996 | Condon et al. | |
| 5,541,926 A | 7/1996 | Saito et al. | |
| 5,553,061 A | 9/1996 | Waggener et al. | |
| 5,566,170 A | 10/1996 | Bakke et al. | |
| 5,598,410 A | 1/1997 | Stone | |
| 5,610,921 A * | 3/1997 | Christensen | 370/395.4 |
| 5,784,373 A * | 7/1998 | Satake et al. | 370/402 |
| 5,872,962 A * | 2/1999 | Hisanaga et al. | 712/230 |
| 5,905,725 A | 5/1999 | Sindhu et al. | |
| 5,909,440 A | 6/1999 | Ferguson et al. | |
| 5,909,443 A | 6/1999 | Fichou et al. | |
| 5,917,820 A | 6/1999 | Rekhter | |
| 5,923,656 A | 7/1999 | Duan et al. | |
| 5,956,341 A * | 9/1999 | Galand et al. | 370/412 |
| 5,991,300 A | 11/1999 | Tappan | |
| 6,032,190 A | 2/2000 | Bremer et al. | |
| 6,046,979 A | 4/2000 | Bauman | |
| 6,052,383 A | 4/2000 | Stoner et al. | |
| 6,064,674 A | 5/2000 | Doidge et al. | |
| 6,075,788 A | 6/2000 | Vogel | |
| 6,094,525 A | 7/2000 | Perlman et al. | |
| 6,128,666 A | 10/2000 | Muller et al. | |
| 6,157,635 A * | 12/2000 | Wang et al. | 370/352 |
| 6,160,811 A | 12/2000 | Partridge et al. | |
| 6,198,751 B1 | 3/2001 | Dorsey et al. | |
| 6,219,339 B1 | 4/2001 | Doshi et al. | |
| 6,219,728 B1 * | 4/2001 | Yin | 710/52 |
| 6,266,706 B1 | 7/2001 | Brodnik et al. | |
| 6,285,665 B1 * | 9/2001 | Chuah | 370/319 |
| 6,304,903 B1 | 10/2001 | Ward | |
| 6,310,893 B1 * | 10/2001 | Yuan et al. | 370/474 |
| 6,434,115 B1 | 8/2002 | Schwartz et al. | |
| 6,671,289 B1 * | 12/2003 | Tamura et al. | 370/474 |
| 6,714,553 B1 | 3/2004 | Poole et al. | |
| 6,791,947 B2 | 9/2004 | Oskouy et al. | |
| 7,209,448 B2 | 4/2007 | Oskouy et al. | |
| 2005/0201396 A1 | 9/2005 | Sindhu et al. | |

OTHER PUBLICATIONS

Turner, J., et al., "Architectural Choices in Large Scale ATM Switches", IEICE Transactions on Communications, JP, Institute of Electronics Information and Comm. Eng., Tokyo, vol. E81-B, No. 1, Feb. 1, 1998, pp. 120-137, XP000778248, ISSN: 0916-8516.

US International Search Authority, International Search Report, PCT/US99/16890, Mailed Mar. 27, 2000, Washington, D.C. 20231.

R. Oskouy et al., co-pending U.S. Appl. No. 11/682,111, filed Mar. 5, 2007, "In-Line Packet Processing".

* cited by examiner

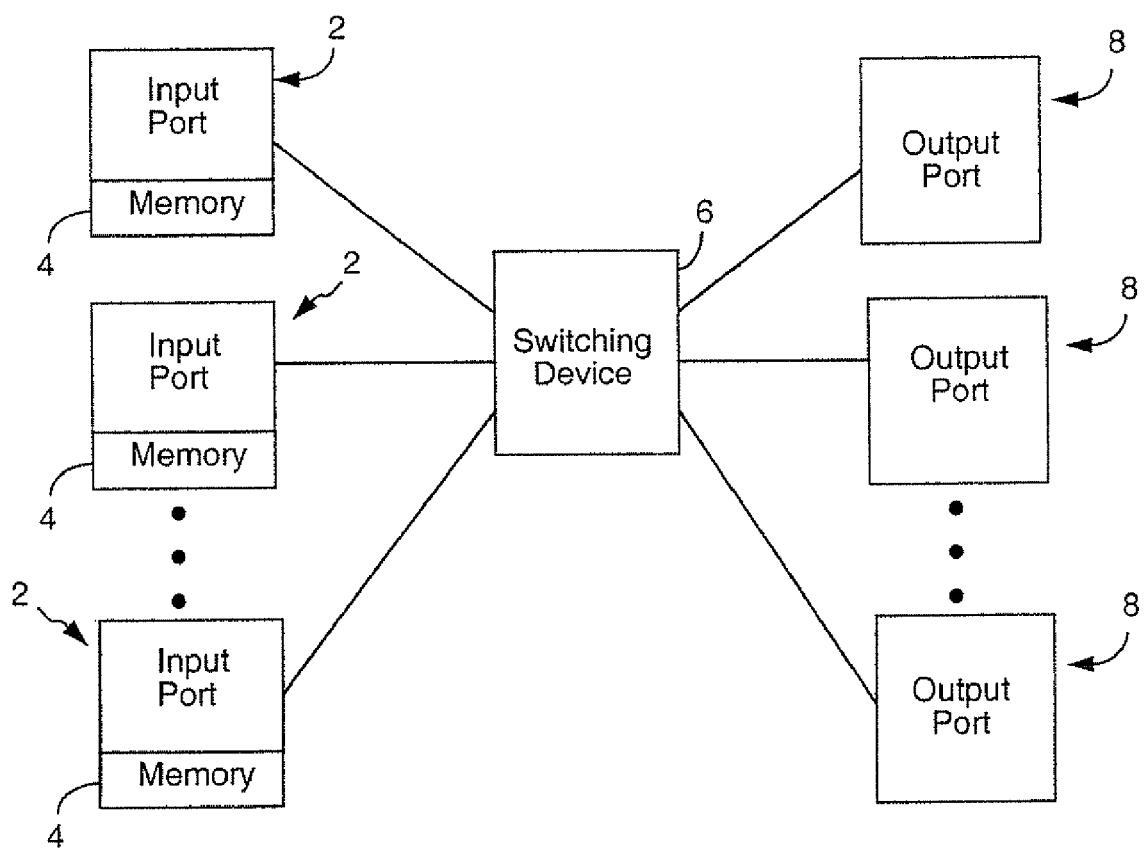
**FIG._1
(PRIOR ART)**

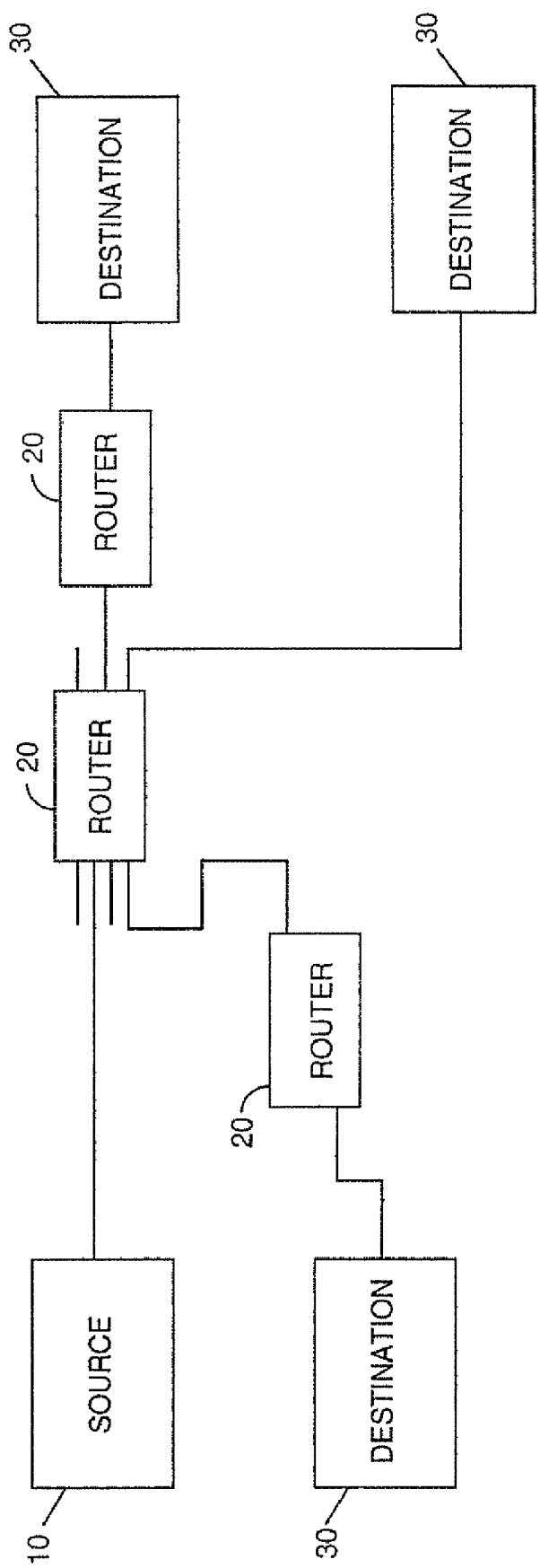
FIG._2A

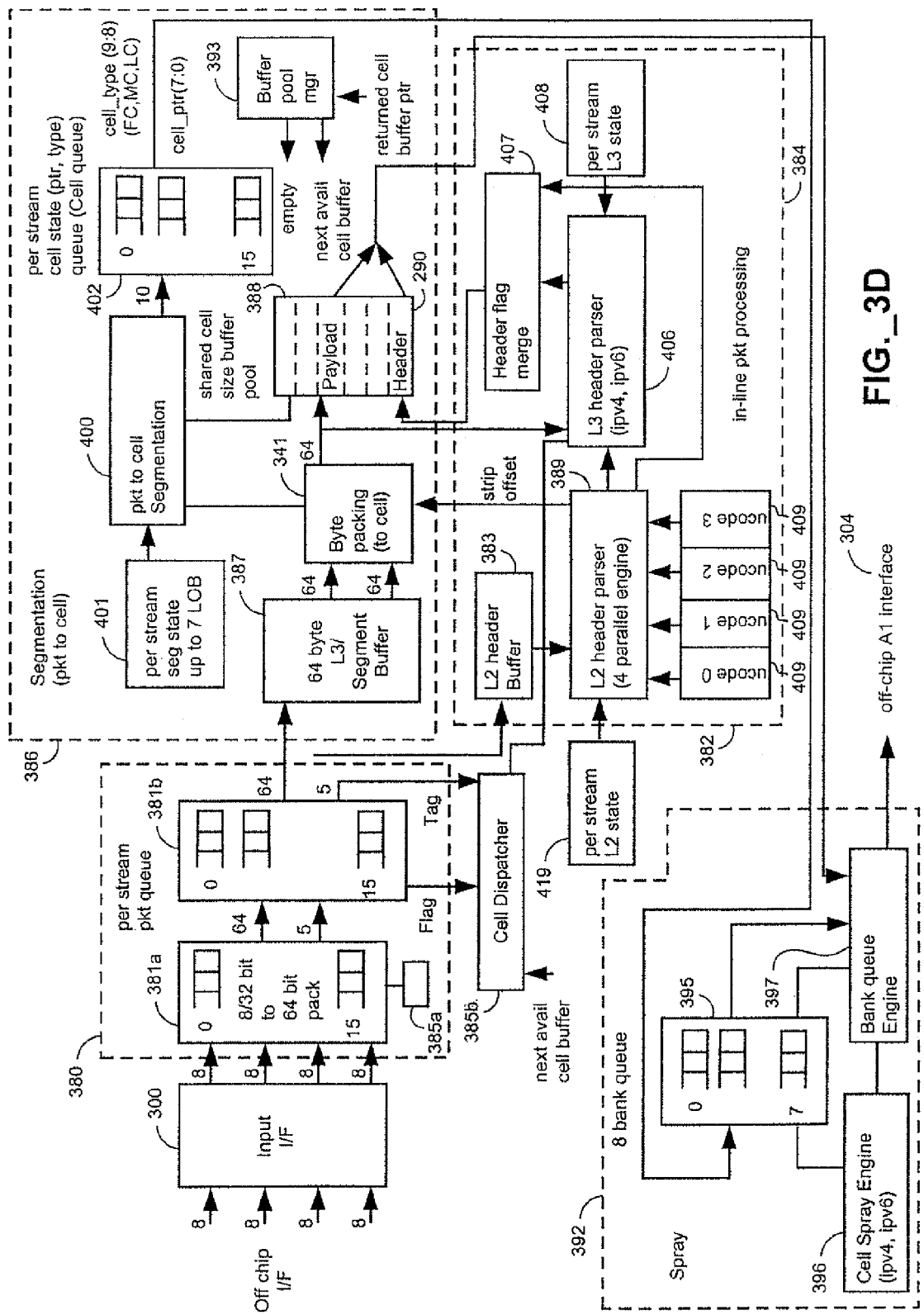
FIG._3D

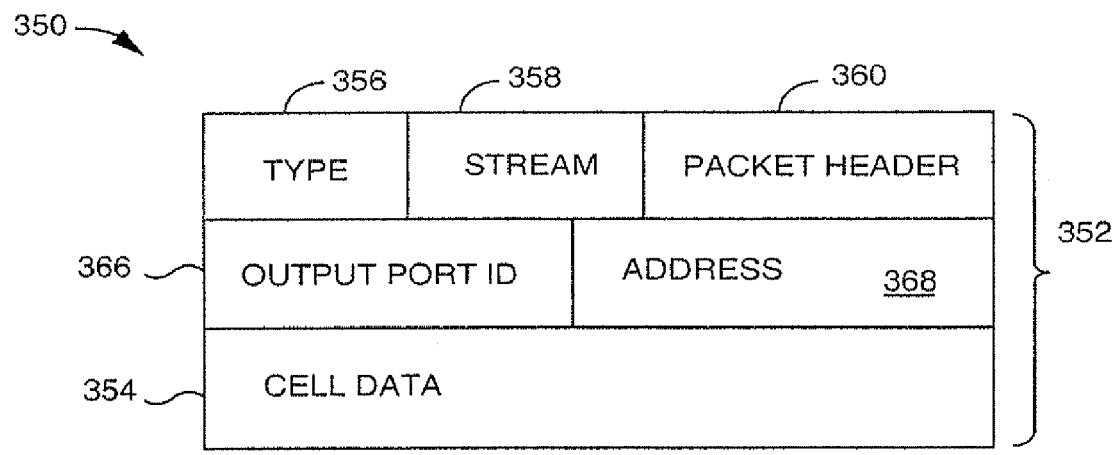
FIG._3E
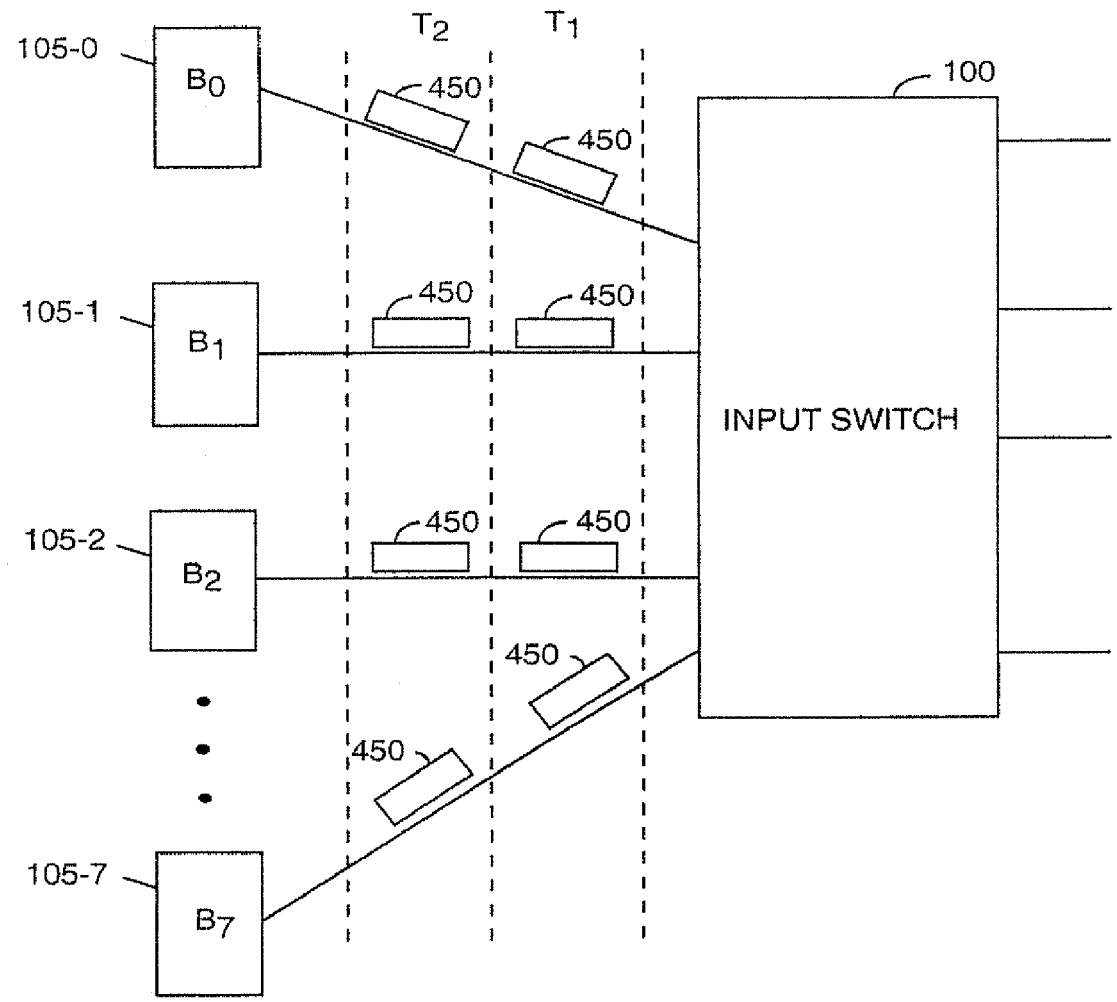
FIG._4

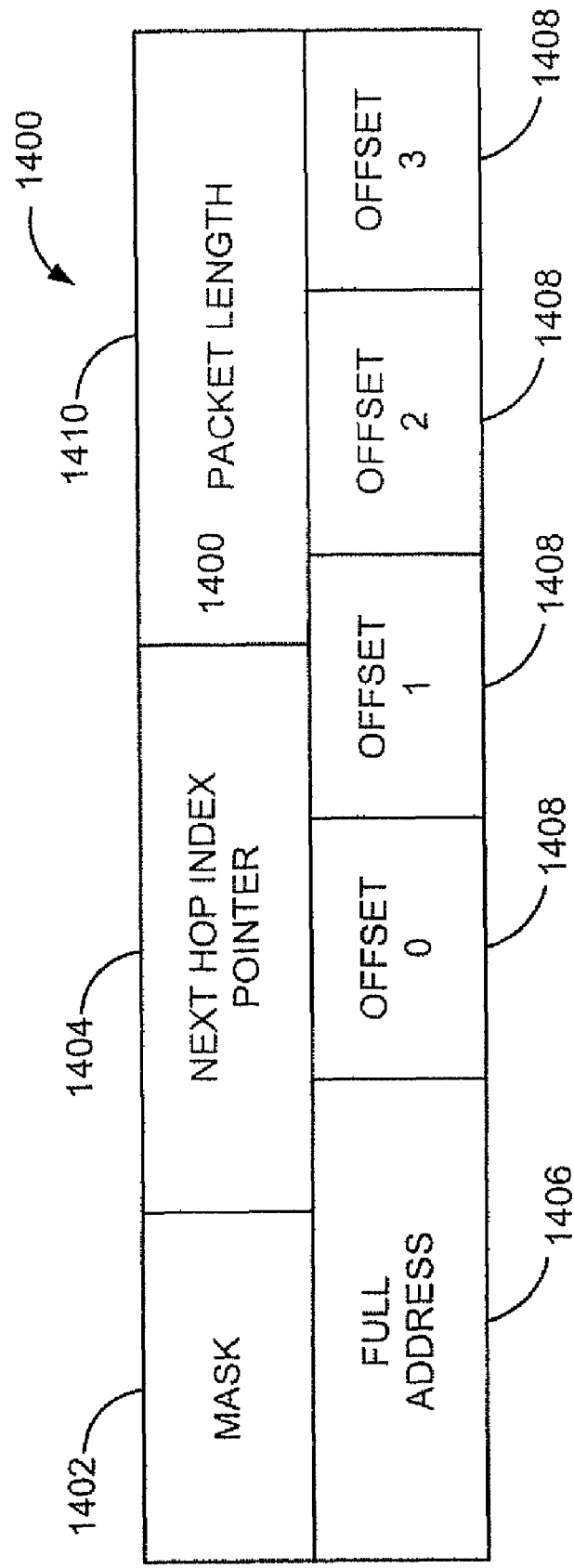
FIG._5

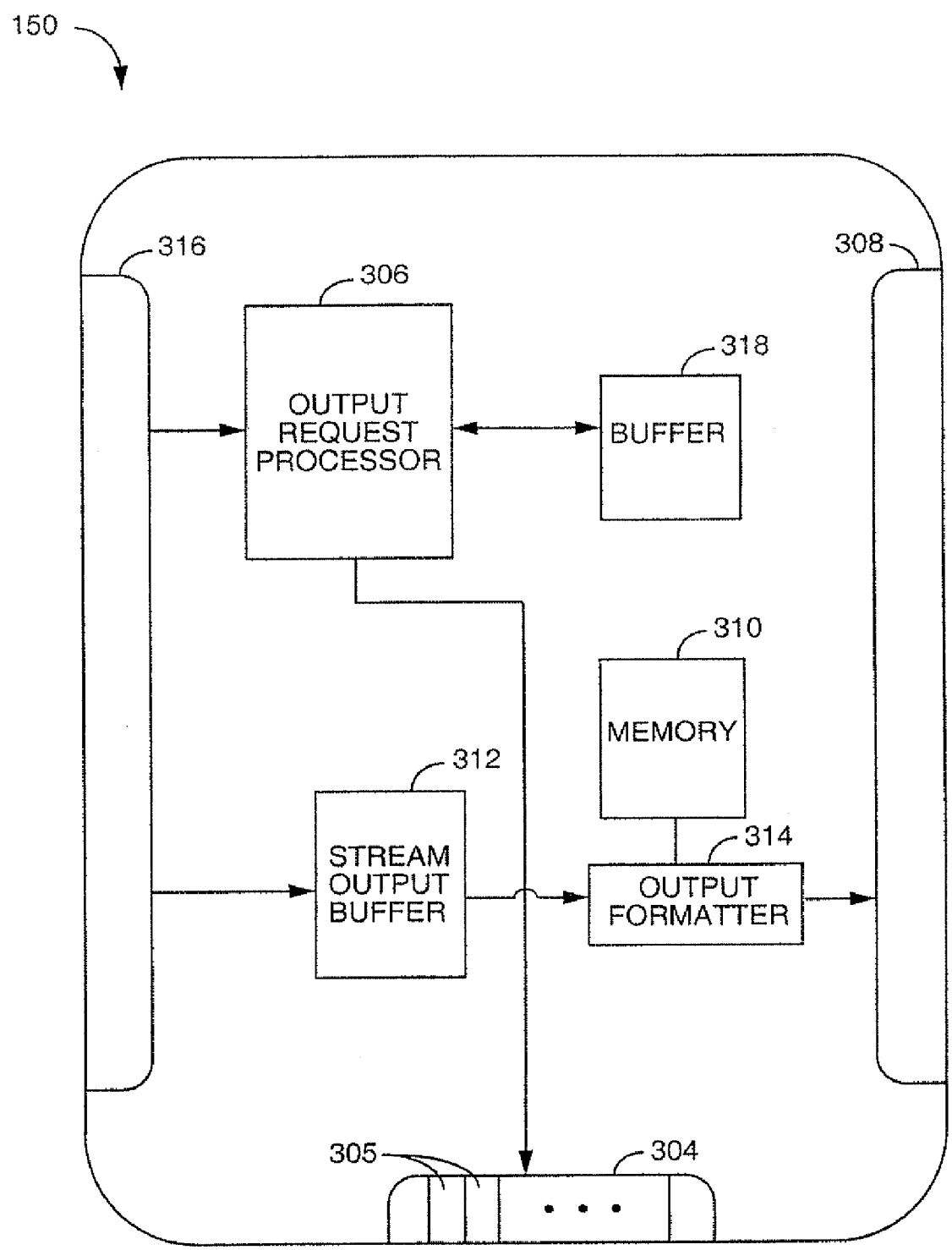
FIG._6

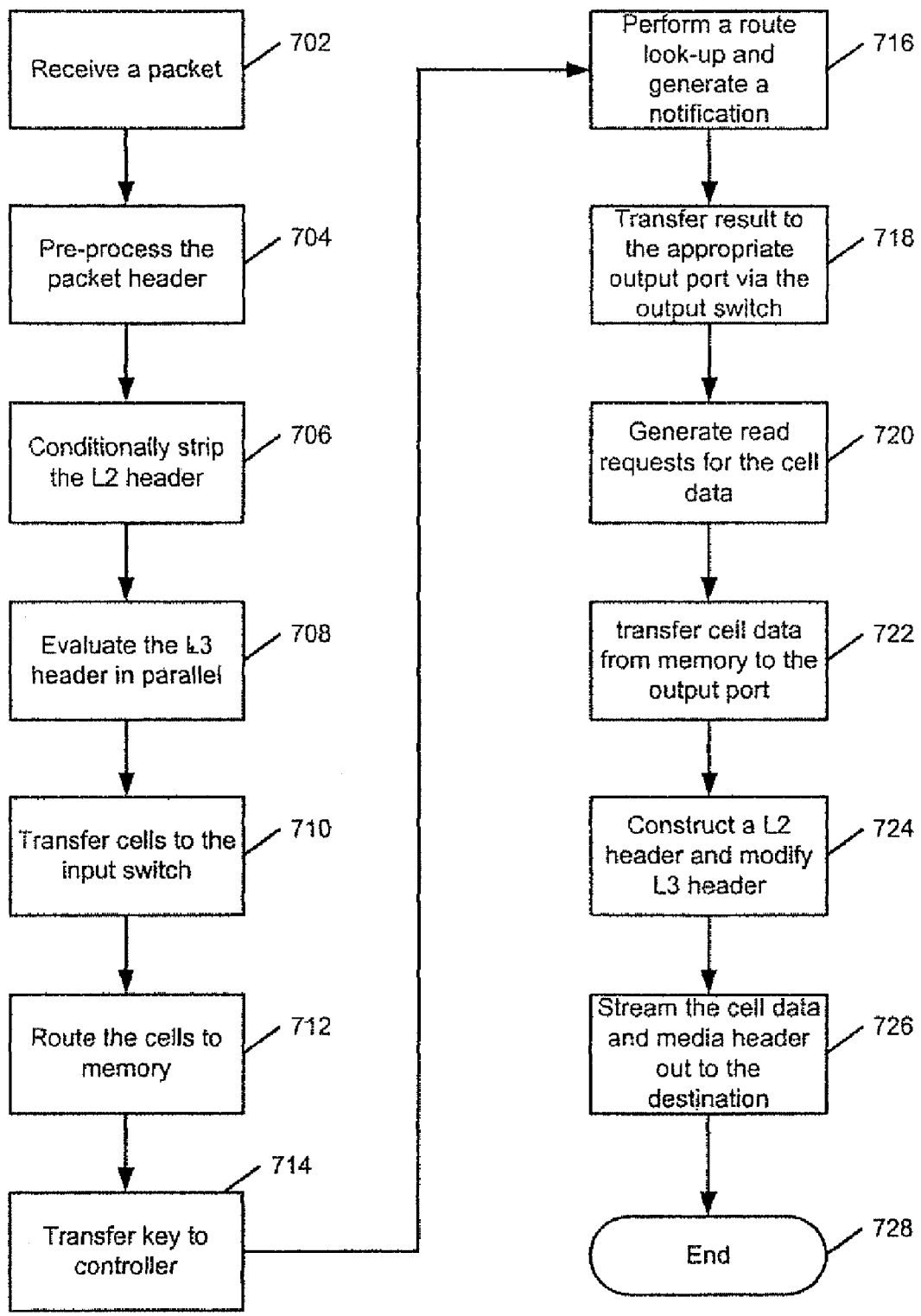
FIG._7

IN-LINE PACKET PROCESSING

CROSS REFERENCE TO RELATED APPLICATIONS

This application is a continuation of U.S. patent application Ser. No. 11/682,111, filed on Mar. 5, 2007, which is a continuation of U.S. patent application Ser. No. 10/081,048 filed on Feb. 20, 2002 now U.S. Pat. No. 7,209,448, which is a continuation of U.S. patent application Ser. No. 09/129,137 filed on Aug. 4, 1998 (now U.S. Pat. No. 6,791,947 issued on Sep. 14, 2004), all of which are incorporated by reference herein.

BACKGROUND

The present invention relates generally to data routing systems, and more particularly to methods and apparatus for efficiently touting packets through a network.

In packet switched communication systems, a router is a switching device that receives packets containing data or control information on one port, and based on destination information contained within the packet, routes the packet out another port to a destination (or an intermediary destination). Conventional routers perform this switching function by evaluating header information contained within a first data block in the packet. The header includes destination information that can be used in determining the proper output port for a particular packet.

Efficient switching of packets through the router is of paramount concern. Referring now to FIG. 1, a conventional router includes a plurality of input ports 2 each including an input buffer (memory) 4, a switching device 6 and a plurality of output ports 8. Data packets received at input port 2 are stored at least temporarily, in memory 4 while destination information associated with each packet is decoded to determine the appropriate switching through switching device 6.

Data packets include both header and data fields and can be of variable lengths. The header includes both format information related to the type of packet and layer data. Networking protocols are defined in terms of layers, with each layer responsible for different portions of the communications in the network. For example TCP/IP is a standard internet network protocol that includes an application layer, transport layer, IP layer (network layer or L3), link layer (L2) and physical layer (L1). A data packet can include a plurality headers, one for each relevant layer that is to handle the packet during routing. Each layer header can include source and destination information as well as other layer specific information. To transfer the packet out of the switch, portions of the header are required to be examined (e.g., Layer 2 and Layer 3, L2 and L3 respectively, header information). Typically, packets are stored in memory 4 while header processing is performed.

Complicating the examination process, the format of the packet headers can vary. Destination or other information (e.g., L3 information) may not always be located at the same position in a header.

Unfortunately, conventional routers are inefficient in a number of respects. Conventional routers are incapable of processing packets in-line. All of the packet header typically must be received prior to the beginning of header processing. Packets are not screened early on for faults necessitating additional bandwidth and resources for handling these bad packets.

SUMMARY OF THE INVENTION

According to one aspect, a method of in-line processing a data packet may include receiving the data packet at a first buffer; dividing the data packet into a number of cells; storing the cells in a first queue; and storing, for each cell, a cell state code that indicates an address of the corresponding cell in the first queue and an indication of a sequence order of the cell within the data packet.

According to another aspect, a device for processing a packet may include a first queue to store a packet; a segmentation buffer to receive blocks of data from the first queue; a cell packetizer to remove unnecessary information from the received blocks of data; an overflow queue; and a cell payload queue to receive data from the overflow queue and the cell packetizer, where the data received by the cell payload queue comprises a cell having a predetermined cell size. The cell packetizer may be further configured to determine an amount of data necessary to replace the removed information, receive an additional block of data from the first queue to replace the removed information, determine whether the amount of data necessary to replace the removed information is less than a size of the block of data, replace the removed information with data from the additional block of data, and store any leftover data from the additional block of data not used to replace the removed information in the overflow queue.

According to yet another aspect, a method may include storing uniform blocks of data from a data packet into a first buffer; removing information from the uniform blocks of data to form payload data; receiving an additional block of data to replace the removed information; replacing the removed information in the payload data with information from the additional block; storing leftover information in an overflow queue; forming cells from the payload data; and storing the cells in a cell payload queue.

BRIEF DESCRIPTION OF THE DRAWINGS

FIG. 1 is a block diagram of a conventional router device.

FIG. 2a is a schematic block diagram of a data routing system according to one embodiment of the present invention.

FIG. 3d is a schematic block diagram of the data handler of a multi-function multiport according to one embodiment of the invention.

FIG. 3e is a data structure for a cell transferred between a multi-function port and an input switch according to one embodiment of the present invention.

FIG. 4 is a schematic block diagram of a router showing the timing and ordering of transfers from a multi-function multipart to the input switch according to one embodiment of the present invention.

FIG. 5 is a data structure for an output request transferred from the controller to the output switch according to one embodiment of the present invention.

FIG. 6 is a schematic block diagram for an output section of a multi-function multiport according to one embodiment of the present invention.

FIG. 7 is a flow diagram for a process of routing a packet through a router according to one embodiment of the present invention.

DETAILED DESCRIPTION

Referring to FIG. 2a, in a packet switching system, a source 10 is connected to one or more routers 20 for transmitting packets to one or more destinations 30. Each router includes a plurality of multi-function multiports that are connected to various sources and destinations. A packet from source 10 can pass through more than one router 20 prior to arriving at its destination.

Figure 2B:
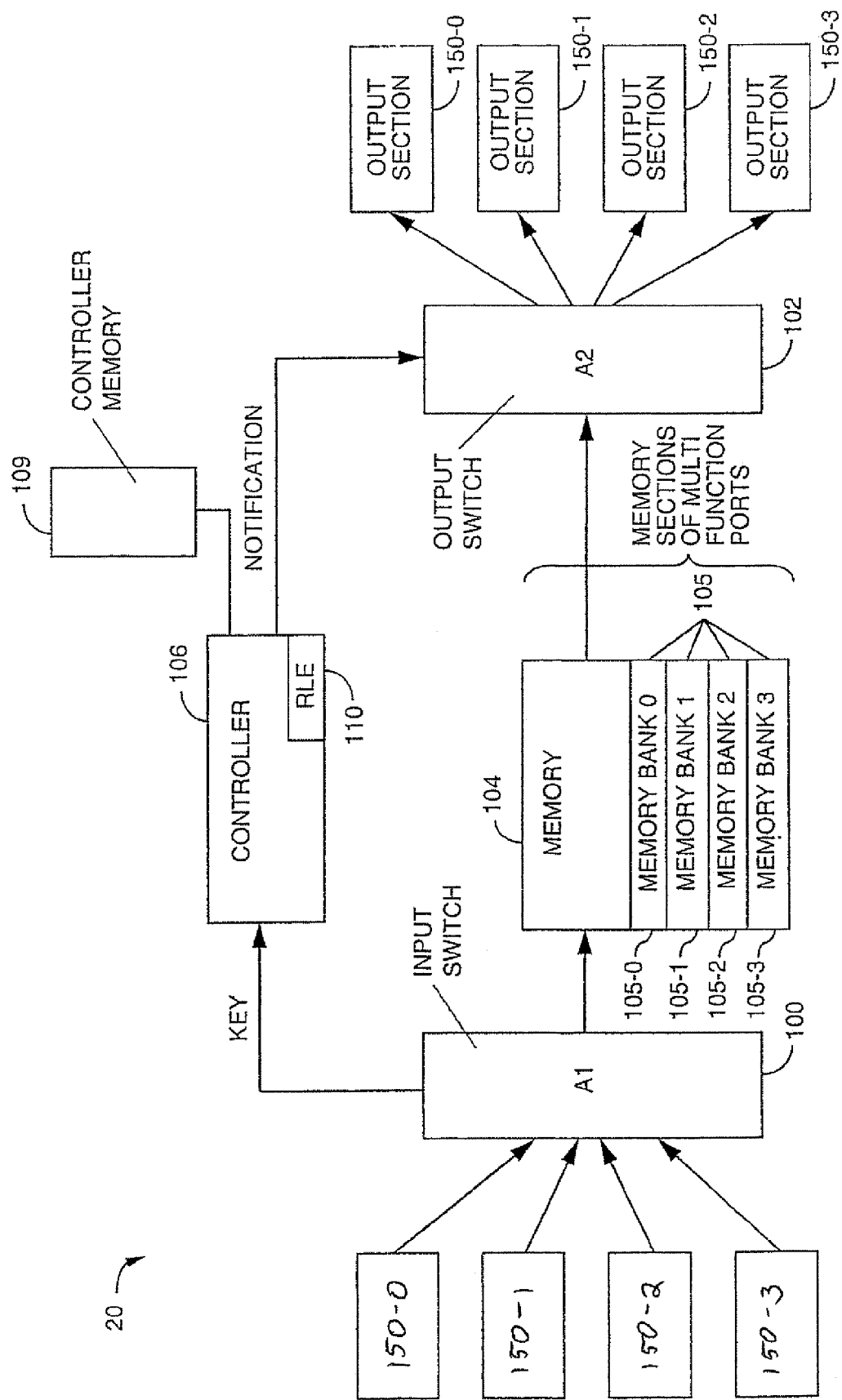
FIG. 2b is a schematic block diagram of a router according to one embodiment of the present invention.

Referring to FIG. 2b, each router 20 includes an input switch 100, an output switch 102, a global data buffer 104 including one or more memory banks 105, a controller 106 and a plurality of multi-function multiports 150 (150-0 through 150-3, respectively). Associated with the controller 106 is controller memory 109 for storing a routing table. Input switch 100 and output switch 102 are connected to each multi-function multiport 150 in router 20. In one embodiment, router 20 includes plug-and-play multi-function multiports which allows for easy expansion capability. The present invention will be described with reference to a system including eight multi-function multiports 150 (even though FIG. 2b only shows four), with each multi-function multiport including up to sixteen input ports and sixteen output ports. Other configurations can be used depending on user load conditions. Each multi-function multiport includes one or more input ports, one or more output ports and a memory. The configuration and operation of the multi-function multiports will be described in greater detail below.

In operation, packets are received at a multi-function multiport 150, transferred to input switch 100 and stored temporarily in global data buffer 104. When the packet is received by input switch 100, a key is read from the packet and transferred to controller 106. The key contains destination information which is derived from a header field associated with the first block of data in a packet and other information (such as source ID, priority data and flow ID).

A route look-up engine 110 in controller 106 performs a tree based search based on the key information and returns a result that includes the output multiport associated with the destination. The result is coupled with other information (such as source ID, flow ID and packet length) for routing the packet through router 20 and provided as a notification from controller 106 to output switch 102. Output switch 102 transfers the notification to the identified multi-function multiport 150. Upon receiving the notification information, the multi-function multiport 150 initiates the transfer of the packet from global data buffer 104 through output switch 102 to the appropriate multi-function multiport 150.

Multi-Function Multiports

Figure 3A:
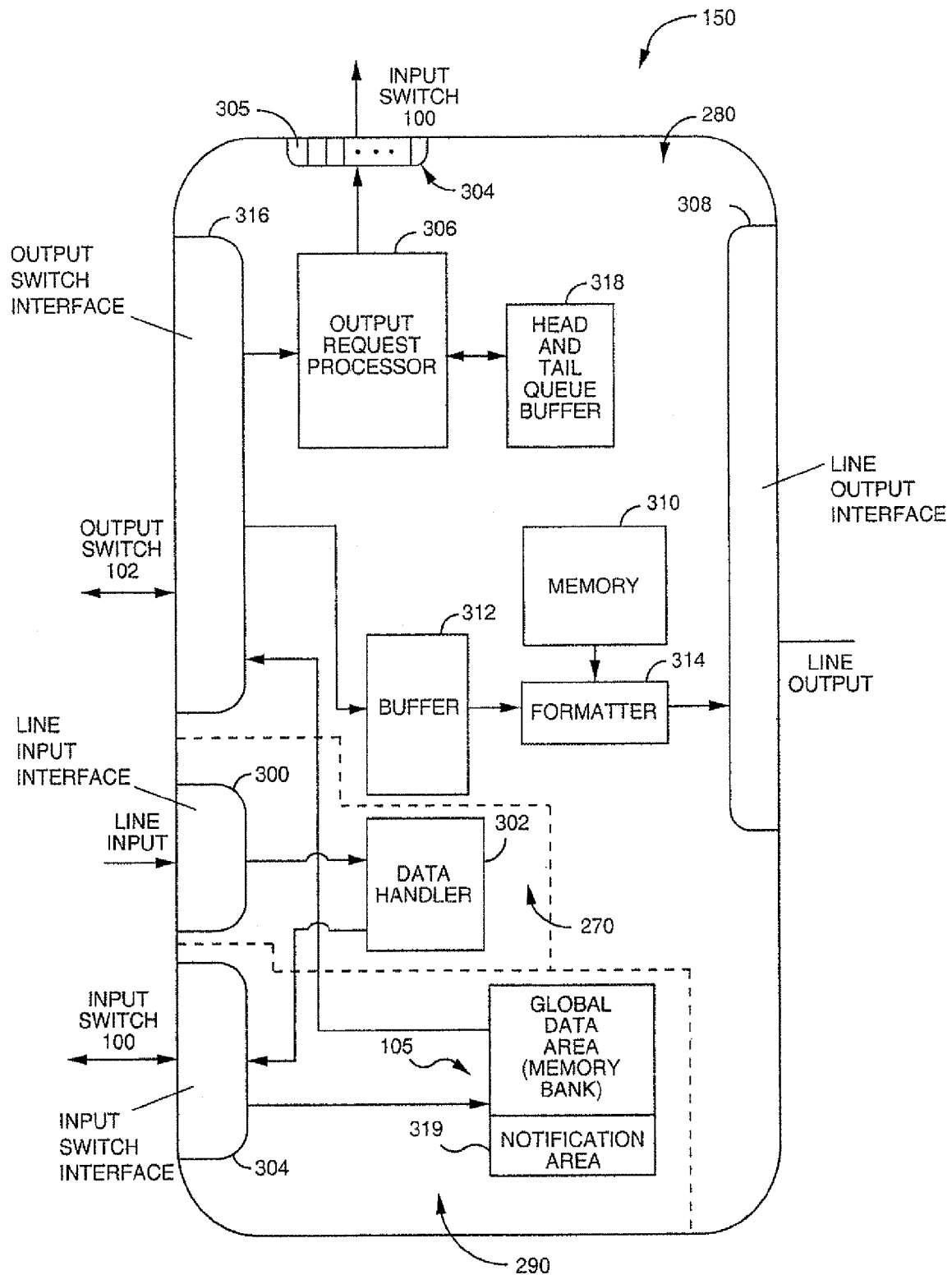
FIG. 3a is a schematic block diagram of an multi-function port according to one embodiment of the present invention.

Referring to FIG. 3a, each multi-function multiport 150 includes an input section 270, an output section 280 and a memory section 290.

Input section 270 includes a line input interface 300, a data handler 302 and an input switch interface 304.

Output section 280 includes an output request processor 306, a line output interface 308, a storage device 310, stream output buffers 312 (one for each output stream), output formatter 314, an output switch interface 316 and head and tail queue buffer 318. In addition, the output section includes a portion of input switch interface 304. Specifically, input switch interface 304 includes read request queues 305, one for each memory bank. The use and operation of the read request queues, stream output buffers, and head and tail queue will be discussed in greater detail below in association with FIG. 6.

Memory section 290 includes a memory bank 105 (which represents a portion of the global data buffer 104) and a notification queue body 319.

Figure 3B:
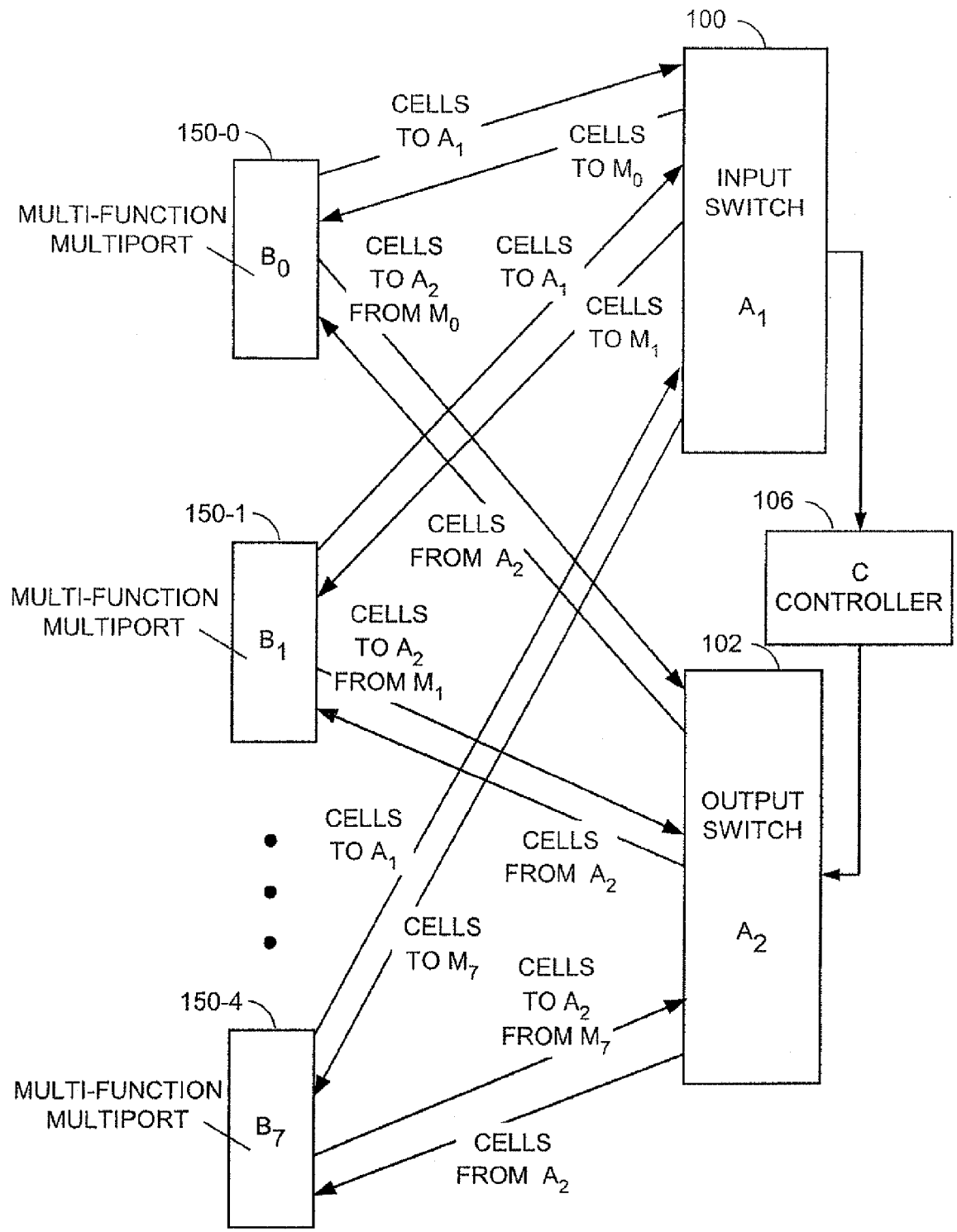
FIG. 3b is a schematic block diagram showing data transfers between components of the router of FIG. 2b according to one embodiment of the present invention.

The multi-function multiport is used in conjunction with the input switch, output switch and controller as is shown in FIG. 3b. The various piece components of the input section, output section and memory section will be described in greater detail below. The combination of the input, output and memory sections into a single unit simplifies the interfaces between the components.

Referring again to FIG. 3a, packets are received at line input interface 300. As the packets are received, data handler 302 divides the packets received into fixed lengths cells. In one embodiment, the length of each cell is 80 bytes, with 16 bytes of internal header (control information) and 64 bytes of cell data. As the data handler divides the incoming packets into fixed length cells, it synchronously outputs the cells to input switch 100 through input switch interface 304.

Figure 3C:
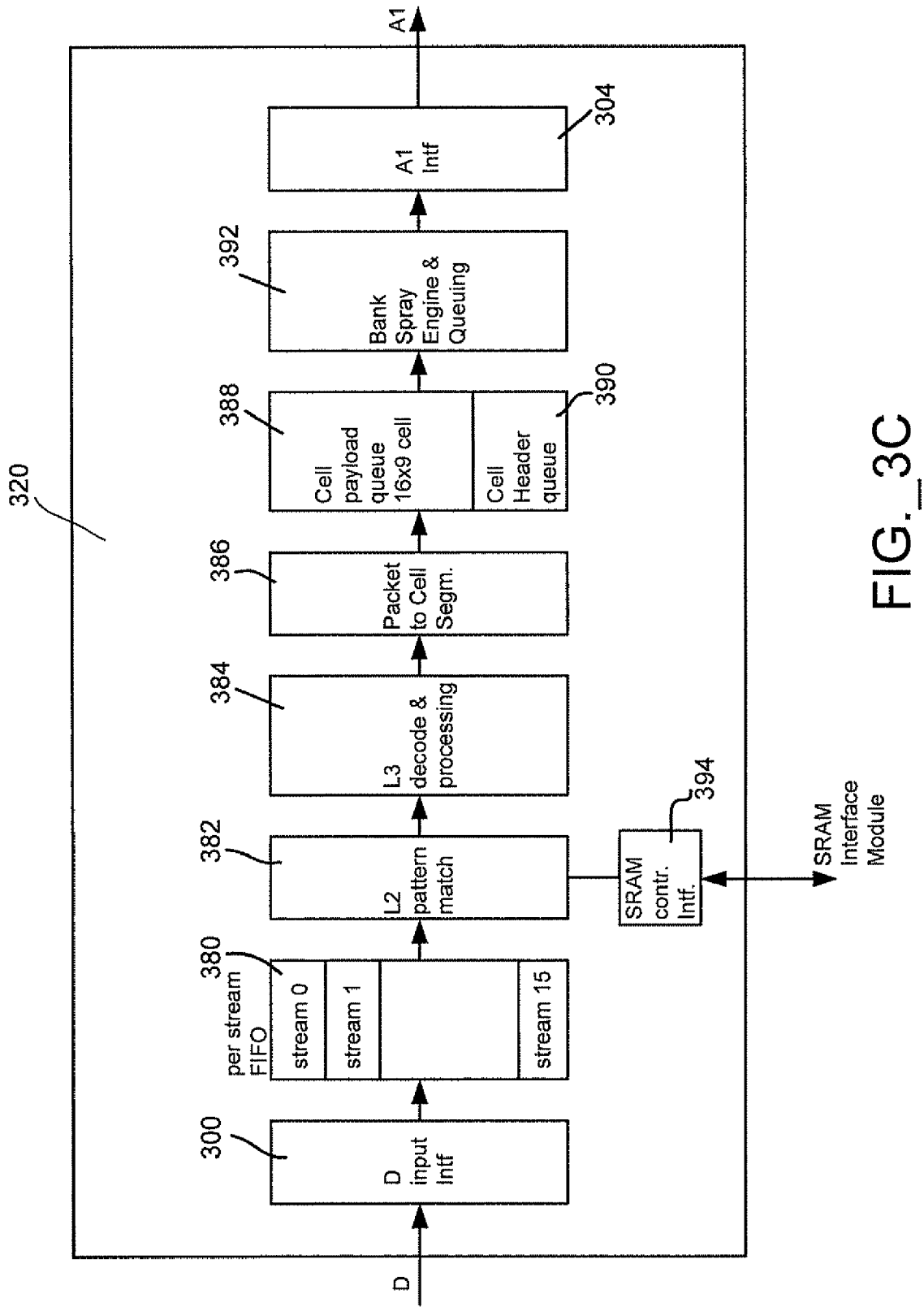
FIG. 3c is a schematic block diagram of the input section of a multi-function multiport according to one embodiment of the invention.

As described above, packets are divided into data cells and transferred into the global data buffer 104 for temporary storage during the look-up process. Data handler 302 of input section 270 divides the packets into data cells and examines data format information (L2/L3 information) from each packet prior to storage of the packet in the global data buffer portion of memory 104 (FIG. 2b). In one implementation shown in FIG. 3c, data handler 302 includes a packing queue 380, L2 pattern match decoder 382, L3 decoder 384, cell segmentation engine 386, cell payload is queue 388, cell header queue 390 and bank spray engine 392.

Each multifunction multiport includes a line input interface 300 that can include up to 16 input ports for receiving data from up to 16 active streams. Each multi-function multiport is configurable to accommodate streams of various formats and in one implementation supports a 2.4 Gbps (OC-48) full duplex interface. Other input configurations are available with an accumulated bandwidth of up to 2.4 Gbps, including up to 16 streams of OC-3 bandwidth. Other configurations include 12 streams of OC-3 bandwidth and one stream of OC-12 bandwidth. Packing queue 380 receives the various input stream data on the input ports and packs the stream data into data words for transfer to segmentation buffer 387 (up to 64 bytes in one implementation). Packing queue 380 includes per stream queues for accumulating data from each stream.

Referring to FIG. 3d, the packing process is performed in two phases. In a first phase, 8 bit or 32 bit data is accumulated in a bit packing queue 381a. Bit packing queue 381a includes stream bit packing queues (381a-1 thru 381a-16), one for each stream. In one implementation, bit packing queue 381a includes 16 stream bit packing queues (when supporting 16 OC-3 streams). Bit packing queue 381a includes a controller 385a for streaming data words from the bit packing queue to a byte packing queue 381b. Each stream bit packing queue can be sized to hold two or more words of data, and in one implementation are sized to hold three 64 bit words of data (8 byte data words). Associated with each data word stored in the stream bit packing queues are control flags which are received along with the stream data. In one embodiment, five (5) bits of flag data are stored with each 64 bit data word in each stream bit packing queue. The five flag data bits are passed with each 64 bit word from the bit packing queue 381a to the byte packing queue 381b.

In one embodiment the control flags include an end of packet without error flag (1 bit), a end of packet with error flag (1 bit), and a last byte pointer (3 bits). The size of the last byte pointer indicates the last byte in the eight (8) byte word of data that contains data in the transfers between the bit packing queue 381a and byte packing queue 381b. In one implementation, line input interface 300 screens the incoming packets and generates the control flag data. The control flag data can be advantageously used in screening packets prior to transfer to the global memory. More specifically, errors detected by the line input interface 300 are reconciled during L2 header processing. A packet that is written to segmentation buffer 387 that has an error flag set is never transferred by the packetizer 391 to payload buffer 388. Data associated with the packet is overwritten in time by a next 64 byte data word from byte packing queue 381b. Other early error detection methods are described in greater detail below in association with L2 and L3 processing.

Based on the availability of data in the individual stream bit packing queues, a single 64 bit word is transferred per clock cycle by controller 385a from bit packing queue 381a to byte packing queue 381b. Controller 385a cycles through the individual bit packing queues in a round-robin fashion to transfer available data words to byte packing queue 381b.

In a second phase of the packing process, byte packing queue 381b accumulates eight (8) byte portions of data (64 bit data words) prior to segmentation. Byte packing queue 381b includes stream byte packing queues (381b-0 thru 381b-15), one for each stream. In one implementation, byte packing queue 381b includes 16 stream byte packing queues to support 16 streams of OC-3 data. Depending on the format of the stream data received, a lesser number of the stream byte packing queues can be used. Byte packing queue 381b is sized to support the input bandwidth, which in one implementation is 2.4 Gbps. Byte packing queue 381b is configurable to support a variety of input stream configurations. Byte packing queue 381b can be a flexible buffer whose resources are dynamically allocated at start-up depending on the input configuration.

Byte packing queue 381b includes a cell dispatcher 385b for streaming data words from byte packing queue 381b to segmentation buffer 387. Each stream byte packing queue can be sized to hold N or more words of data, and in one implementation each is sized to hold eighteen (18) eight (8) byte data portions (64 bit data words). Associated with each data word stored in the stream byte packing queues are control flags which are received along with the stream data.

Depending on the input configuration of the stream data received, a lesser number of divisions for byte packing queue 381b may be required. For example, when supporting four OC-12 streams, byte packing queue 381b is configured with four byte packing queues to accumulate 64 bit data words for transfer to segmentation buffer 387.

Cell dispatcher 385b operates in a round-robin fashion to cycle through the various individual stream byte packing queues to extract data words for transfer to segmentation buffer 387. In one embodiment, eight (8) byte read cycles are used to transfer data from the individual byte packing queues to segmentation buffer 387.

Each byte packing queue signals to the cell dispatcher when an appropriate number of data words have been accumulated and thus the respective byte packing queue is ready for servicing. A stream byte packing queue initiates a signal to cell dispatcher 385b indicating data is ripe for transfer upon the occurrence of one of three trigger conditions: upon receipt of the first 96 bytes of a new packet; upon receipt of an end of packet flag; or upon receipt of 64 bytes of data which do not comprise the beginning or the end of a packet. The flags received along with the data words from the bit packing queue 381a are used to evaluate the data words received from byte packing queue 381a to determine when the various conditions have been satisfied.

The individual stream byte packing queues are sized to ensure that entries received from bit packing queue 381a are not lost while waiting for service by cell dispatcher 385b. In an embodiment that includes 16 OC-3 input streams, all of the stream byte packing queues are identically sized to include eighteen 64 bit words.

L2 Header Processing

As described above, data words are transferred from byte packing queue 381b to segmentation buffer 387 as they become available. In addition, coincident with the transfer, the first 32 bytes of data packet (four 8 byte data words) are also transferred to L2 header buffer 383 of L2 pattern match decoder 382. For middle packets which include up to 64 bytes of data in the middle of a packet, cell dispatcher 385b disables the transfer of data to the L2 header buffer and no L2 header processing is required. The present invention processes packets in-line. In-line processing includes two components, one at the input prior to storage of a packet (or portion of the packet in packet memory, i.e. memory 104 of FIG. 2b) and the other at the output after packets are read from packet memory. The input component conditionally strips the L2 header, finds the start of the L3 header and checks the L3 header for errors. In addition, other early error verifications can be performed to assure that bad packets are dropped prior to storage in packet memory. The output component attaches a new L2 header to a packet and updates certain L3 header fields as required. In-line processing significantly increases throughput in the router allowing for the early dumping of packets prior to storage in packet memory. The input component is described immediately below. The output component is described later in the specification.

While the first 32 bytes of a packet are transferred to L2 header buffer 383, a flag is set and passed to L2 header parser 389 indicating a packet is available to process. Associated with L2 header parser 389 is a decoder 409 for processing L2 header information for each packet. Decoder 409 can include a micro-coded engine or subroutine operating to decode header information (L2 header information). In the implementation shown, the micro-coded engine includes four sub-processes 409-0 through 409-3. The number of sub-processes can be selected to minimize the number of clock cycles required to examine the L2 header information. L2 header parser 389 under the control of decoder 409 consumes bytes stored in L2 header buffer 383 to locate a header offset. The header offset indicates the end of the L2 header and the beginning of the next layer header (e.g., L3 header) for a given packet.

In addition, the L2 header parser examines portions of the L2 header for errors. Errors arising form unrecognized L2 headers, unconfigured L2 connections, or other L2 errors are immediately identified and dropped prior to being written to memory. In one implementation packets are dropped by never transferring the packet out of the segmentation buffer 387. The dropped packet is overwritten in time by a next 64 byte data word from byte packing queue 381b.

Associated with the L2 header parser is a per stream L2 state queue 419. Per stream state queue 499 stores flags associated with a micro-code starting address, priority (precedence) flag for the stream, an interface index mapping to one or more logical interfaces, virtual connection stream state information and channel stream state information. The per stream state queue stores information associated with each stream so as to assure continuity in steam processing.

Segmentation buffer 387 is sized to accommodate up to eight data word (64 bytes) in one implementation. Associated with the segmentation buffer is a selectable start read pointer that indicates the location in the segmentation buffer to begin read operations (when reading data from the segmentation engine by packetizer 391). Data bytes are read from byte packing queue 381b and stored in segmentation buffer 387. Subsequent byte transfers (beyond the first 64 bytes) from byte packing queue 381b can result in a wrap around condition. Wrap around results in the overwriting of a portion of the contents of the segmentation buffer. Wrap around may arise when a portion of the L2 header is overwritten in accordance with the strip offset determined as part of L2 header processing. A circular buffer can be used to minimize the size of the buffer required to support the line rate processing.

The segmentation buffer provides temporary storage of the data words transferred from the byte packing queue while the L2 processing completes. Transfer from segmentation buffer 387 by cell packetizer 391 to cell payload queue 388 is initiated upon completion of the L2 processing and delivery of the offset information to cell packetizer 391. Cell dispatcher 385b triggers the transfer of middle data words in a packet (all data words after the first data word associated with a packet).

In one implementation, segmentation buffer 387 can be a dual output ported device that includes two output ports for providing data bytes to cell packetizer 391 at twice the input rate. The dual porting allows for the reading of up to sixteen bytes of data from segmentation buffer 387 during a single read cycle by cell packetizer 391.

Cell Formation

Cell packetizer 391 is an engine that services cell segmentation buffer 387 providing a cell sized amount of data to cell payload queue 388. As described above, cells are the preferred storage mechanism for storing a fixed portion of a packet. Each cell includes a data portion and a header portion. In one implementation, cell packetizer 391 transfers 64 bytes of data to cell payload queue 388. Cell packetizer receives as an input cell data from segmentation buffer 387 and from the segmentation state queue 401 as well as offset information from L2 pattern match decoder 382. The operation of the segmentation state queue 401 is described in detail below.

As described above, the offset information is derived from the L2 packet header. The offset information can be provided in the form of a pointer pointing to a particular location in the data stored in segmentation buffer 387. The pointer can be used to indicate the particular byte in the data transferred from the segmentation buffer that marks the beginning the next layer header. Cell packetizer 391 can discard those portions of the data that belong to the L2 header necessitating further reads from the byte packing queue 381b to fill a data portion of a cell (64 byte) in cell payload queue 388.

The offset may not arise exactly on an eight byte boundary necessitating the storage of overflow data. To facilitate block transfers from byte packing queue 381b to segmentation buffer 387 (8 byte blocks), an overflow queue is provided. Segmentation state queue 401 includes a queue sized to contain N−1 bytes of data for each stream, where N is equal to the size of the block transfers from byte packing queue 381b to segmentation buffer 387. Extra bytes that are required to be read from byte packing queue 381b to facilitate the filling of a cell in cell payload queue 388 are stored in segmentation state queue 401.

At the beginning of a cell packing operation, cell packetizer 391 first checks to determine if extra bytes for the stream being processed are present in segmentation state queue 401. If so, the extra bytes are loaded first prior to the loading of bytes from the segmentation buffer 387. A cell segmentation engine 400 oversees the transfer of data from segmentation state queue 401 to cell packetizer 391. In one implementation, each queue in the segmentation state queue 401 stores up to seven leftover bytes of data that may have been required to be read in order to fill the previous cell associated with the given stream.

The position in cell payload queue 388 to which the cell is written is controlled by buffer pool manager 393. Cell dispatcher 385b receives feedback from buffer pool manager 393 as entries are extracted from cell payload queue 388. A slot must be available in cell payload queue 388 prior to the packetizing of the cell data and extraction from byte packing queue 381b. Buffer pool manager includes a pointer that indicates the next available cell in the cell payload queue that can be written to by cell packetizer 391. As each cell is written into cell payload queue 388 an associated header is written into the cell header queue 390.

Ordering of cells at the stream level is accomplished through use of cell state queue 402. Cells in the same stream must be extracted from cell payload queue 388 in sequential order. Ordering is achieved by writing a code to a per stream queue 388 as each cell is transferred into cell payload queue 388. More specifically, for each write of a data portion of a cell by cell packetizer 391 into cell payload queue 388, cell segmentation engine 400 writes a code that is stored in cell state queue 402. Cell state queue 402 includes a queue for each stream in the input. As each cell is written to cell payload queue 388, a code including address and state information is written to cell state queue 402. The address information includes a pointer to the location of the data portion of the cell in cell payload queue 388. The state information includes information indicating whether the cell is the first cell, middle cell or last cell in a packet. In one implementation, the code is 10 bits in length and includes two (2) bits indicating whether the cell is a first cell, middle cell or last cell as well as eight (8) bits of address information.

L3 Header Processing

The next layer header processing can be performed in parallel to the data transfers to the cell payload queue. In one implementation, L3 header processing is performed in parallel to the packing of data by cell packetizer 391. L3 header parser 406 snoops on the bus between the cell packetizer and cell payload queue 388 examining the L3 header data to derive a header to be stored in an associated entry in cell header queue 390.

Associated with L3 header parser 406 is a L3 state buffer 408. The L3 state buffer 408 includes a plurality of queues, one for each stream, and operates to store L3 header information derived from a previous portion of a packet by L3 header parser 406. L3 header data can extend beyond the first 64 bytes of a data packet. Accordingly, L3 header processing can begin and then be delayed due to insufficient data (not all of the L3 header information is part of the first 64 byte data word associated with a packet). Alternatively, L3 processing can be delayed until receipt of all of the L3 header data. In either case, L3 state buffer 408 is used to store L3 state information while waiting for a second data portion for a packet in the same stream to be processed by cell packetizer 391.

L3 header processing includes error checking for checksum errors, packet length errors, or other L3 header errors. If an error is detected, then the pointer associated with a cell that is written to the cell payload queue 388 is not committed. Pointers associated with cells in the cell payload queue are stored in cell state queue 402. The operation of cell state queue 402 is described in greater detail below.

Cell headers are constructed and stored in cell header queue 390. The format for a cell header is described in greater detail below in association with FIG. 3e. L3 header parser 406 examines L3 header data while snooping on the bus to derive values for the various L3 flags stored in a cell header. L2 header parser 389 derives a series of L2 flags while processing the L2 header. These flags are used by the look-up engine and are based on the type of L2 packet received. L2/L3 header merge 407 collects L2 flag data from L2 header parser 389 and stores the flag data temporarily while the L3 header is processed. L3 flags detected by the L3 header parser are combined with the L2 flags and stored in the cell header.

The flags store information required for the efficient downstream processing of a given packet. In one implementation, the L2 flags derived during L2 processing include a packet loss priority flag, a send packet to processor flag, a sample packet flag and a physical multicast flag. The L3 flags derived during L3 header processing include an option flag, packet priority flag, transmission control protocol (TCP) flag, protocol type flag, and DF (don't fragment) flag.

The packet loss priority flag is used to determine a priority for packets that are dropped due to congestion in an output port of the router. The dropping of packets due to congestion is described in greater detail in co-pending patent application entitled "HIGH SPEED SWITCHING DEVICE", filed Apr. 18, 1997, assigned Ser. No. 08/844,171, which is hereby expressly incorporated by reference.

The send packet to processor flag indicates that a packet is not to be forwarded out from the router and only sent to the controller for processing. The sample packet flag indicates that a packet is to be forwarded (to the appropriate output port) and also sent to the controller for processing. The physical multicast flag identifies multicast packets.

The option flag indicates that the packet has an option header (indicates that the L3 header is greater than the minimal size, e.g., 20 bytes for IPV4 packets). The packet priority flag indicates the priority of the packet and is used by the output portion of the multi-function multiport. The TCP flag indicates the packet is a TCP packet. The protocol flag indicates the L3 protocol type. The protocol flag is used by the input switch to determine the length of the key to be passed to the controller. The DF flag indicates whether the packet is to be fragmented. Fragmentation may occur at the output interface depending on the configuration of the particular interface. Setting the DF flag will result in the dropping of the packet at the output interface rather than fragment.

The header of a cell is generated from data associated with the cell type (indirect cell, direct cell, and data cells) along with header flags extracted during L2 and L3 header processing as described above. In one implementation, the position in the cell header queue 389 that the header is written to is derived from the location in the cell payload queue 388. The parallelism of the addressing for headers and cell data portions simplifies cell processing.

Spraying of Packets Across Memory Banks

Bank spray engine 392 includes a spray bank queue 395, cell spray engine 396 and bank queue engine 397. The queues in cell state queue 402 are serviced by cell spray engine 396. Spray engine 396 sequences through the queues and delivers addresses associated with cells to spray bank queue 395. Spray bank queue 395 includes a plurality of queues, one for each active memory bank in the router. In one implementation, spray bank queue 395 includes eight queues corresponding to eight memory banks. Entries in the cell state queues are serviced sequentially and provided as an input to a queue in spray bank queue 395. Consecutive entries in a queue associated with a particular stream in cell state queue 402 are sprayed sequentially to the queues of spray bank queue 395.

Spray bank queue 395 is serviced in a strict round-robin fashion by bank queue engine 397. Bank queue engine 397 receives as an input the next entry from spray bank queue 395. Each entry indicates both an address in the cell payload queue 388 for the next cell to be processed as well as an indication of whether or not the cell is a first cell, middle cell or last cell to be processed. Bank engine queue 397 extracts the indicated cell data from payload queue 388 and the associated header information from cell header queue 390. The complete cell is provided as an output to input switch interface 304.

The format for transfers between the multi-function multiport and the input switch is shown in FIG. 3e. A cell 350 transferred from a multi-function multiport 150 to the input switch contains a cell header 352 and cell data 354. Cell header 352 includes a type field 356, stream field 358, and packet header fields 360. In addition, cell header 352 includes an independent read request in the form of a multi-function multiport identifier 366 and address 368.

The type field 356 indicates the type of cell to be transferred from the multi-function multiport. At each cell slot (20 clock cycles in one embodiment), a multi-function multiport can transfer either a data cell, an indirect cell placeholder, or a delayed indirect cell placeholder. Data cells contain data associated with an incoming packet. An indirect cell placeholder is an empty cell, and is used in conjunction with indirect addressing for the storage of the cells in the global data buffer 104. Delayed indirect cell placeholders arise when a data stream that requires indirect addressing terminates at a time prior to the designated time for writing the last indirect addressing cell associated with the data stream to global data buffer 104. The generation and operation of indirect placeholders and delayed indirect placeholders will be discussed in greater detail below in conjunction with FIG. 7.

Stream field 358 indicates the stream to which the cell data belongs. In one embodiment of the present invention, each multi-function multiport is capable of handling up to sixteen separate streams of data at a time, one on each of its respective 16 input ports.

Packet header field 360 contains header information associated with a given packet and includes start offset information, packet length, interface index information and L2 and L3 flags generated as part of the L2 and L3 decoding processes recited above.

Multi-function multiport identifier 366 identifies the multi-function multiport which is sourcing the read request. Address 368 indicates the address in global data buffer 104 to be read.

Referring now to FIG. 4, a single cell 450 is transferred from a multi-function multiport 150 to input switch 100 at each cell (time) slot "T". For a given cell slot "T", input switch 100 receives a total of "N" cells, where "N" is equal to the number of multi-function multiports.

In one embodiment, cells from a given stream can be written to memory in an order that is different from the arrival order. These out of order writes are performed to make efficient use of scarce bandwidth between the multi-function multiports and the input switch. When a packet comes in to the multi-function multiport, it is broken up into cells as described above as the bytes arrive and the cells are placed in per-bank output queues on the way to the input switch. These queues are designed to share scarce interconnect bandwidth between the streams of a multi-functional multiport in the most efficient way possible, but they have the detrimental effect of reordering cells at the interface between the multi-function multiport and the input switch. Thus the cells from a given stream can arrive at the input switch out of order. The multi-function multiport marks the data cells of a stream with one of four codes: first cell (FC); intermediate data cell (DC); last cell (LC); or first cell which happens to be also a last cell (FLC).

Input Switch

Referring again to FIG. 2b, input switch 100 routes cells to global data buffer 104. The architecture of input switch 100 and the routing of cells through the input switch 100 is described in greater detail in co-pending patent application entitled "HIGH SPEED SWITCHING DEVICE", filed Apr. 18, 1997, assigned Ser. No. 08/844,171.

Memory Architecture

The memory architecture and routing of cells through global data buffer 104 is described in greater detail in co-pending patent application entitled "HIGH SPEED SWITCHING DEVICE", filed Apr. 18, 1997, assigned Ser. No. 08/844,171.

Incoming packets are broken up into as many cells as needed and the cells are written to the global data buffer as they arrive. The global data buffer is treated as a single large circular buffer. The input switch maintains an array of write pointers, one per active bank, to keep track of where to write the next cell. The pointers start out at one end of the buffer and advance until they eventually wrap around and overwrite packets that were written a long time ago. An ageing mechanism is used to guard against reading cells that may have been overwritten by subsequent packets. The cells of packets arriving on a given stream are interleaved strictly across the active banks to spread the bandwidth load.

Controller

Controller 106 includes controller memory 109, route look-up engine 110, an input switch interface and output switch interface. Controller 106 receives a route look-up request from input switch 100 at the input switch interface. Controller 106 performs a best match look-up and outputs a notification through the output switch interface to output switch 102. The process of matching keys retrieved from a packet in order to determine a best match route through the router is described in greater detail in co-pending patent application entitled "HIGH SPEED VARIABLE LENGTH BEST MATCH LOOK-UP IN A SWITCHING DEVICE", filed on Dec. 16, 1996, by Fergusen et al., Ser. No. 08/767,576, which is hereby expressly incorporated by reference.

The notification includes a result which indicates the multi-function multiport to be used in the transfer of the packet to its destination.

Referring now to FIG. 5, the data structure associated with the notification outputted by the controller 106 to the output switch 102 is shown. The data structure 1400 for the notification includes a mask 1402, a next hop index pointer 1404, full address 1406, offsets 1408 and packet length 1410.

The mask field 1402 is used to indicate which multi-function multiport connected to output switch 102 is to transfer the packet. In one embodiment, the notification can be sent to more than one multi-function multiport resulting in the broadcast of the associated packet.

Associated with each multi-function multiport 150 is a storage 310. The next hop index pointer points to a location in storage 310. Storage 310 is used to store media header information associated with a particular type of packet transfer. Next hop addresses, media headers and storage 310 will be described in greater detail below in association with the output section of multi-function multiport 150.

The full address 1406 indicates the starting address in the global data buffer where the first cell in the packet is stored. As was described above, offsets 1408 provide linking information for retrieving cells or an indirect cell associated with the packet. Packet length filed 1410 indicates the length of the associated packet and can be used to determine if indirect cells will have to be retrieved.

Output Switch

Referring again to FIG. 2b, output switch 102 processes notifications received from controller 106 for transfer to an appropriate multi-function multiport 150. The architecture and routing of cells through output switch 102 is described in greater detail in co-pending patent application entitled "HIGH SPEED SWITCHING DEVICE", filed Apr. 18, 1997, assigned Ser. No. 08/844,171, which is hereby expressly incorporated by reference.

Output Section of a Multi-Function Multiport

Referring now to FIG. 6, each multi-function multiport 150 includes an output switch interface 316, an input switch interface 304 including read request queues, head and tail queue buffer 318, an output request processor 306, an line output interface 308, storage device (memory) 310, stream output buffers 312 and output formatter 314.

A multi-function multiport 150 receives notification that a packet is to be processed in the form of a notification received at the output switch interface 316. Output request processor 306 processes notifications, storing each in an appropriate location in head and tail queue buffer 318 and servicing notification requests as they make their way through the various priority queues in head and tail queue buffer 318. The servicing of requests results in the generation of a read request to input switch 100 associated with the first address in memory where the packet (associated with the particular notification) is stored in the global data buffer. The architecture and operation of the notification queues is described in greater detail in co-pending patent application entitled "HIGH SPEED SWITCHING DEVICE", filed Apr. 18, 1997, assigned Ser. No. 08/844,171.

As cells are received back at the multi-function multiport 150 (responsive to the read requests), they are stored in an associated stream output buffer 312. Stream output buffer 312 includes a plurality of FIFOs, one for each stream. Each cell received for a stream is placed in the streams associated FIFO. For given packet, the multi-function multipart stores a fixed number of cells (in the FIFO) required to provide a streamed output prior to initializing the output of the stream to line output interface 308. In one embodiment of the present invention, twelve cells are stored prior to beginning output (stream data) from the output port. The selection of the number of cells for storage in output buffer 312 is based on the latency in the read process (number of clock cycles between a read request from an multi-function multiport and the arrival of the cell associated with the read request to the output port).

Output formatter 314 receives the cells from output buffer 312 and couples the data with media header information stored in memory 310. Each request (notification) received from output switch 102 includes a next hop index. The next hop index indicates the starting address in memory 310 of the media header information associated with a given type of transmission (derived from the destination of the packet). Media header information stored in memory 310 can be loaded in memory 310 upon initialization of the router and updated by the controller as required. The media header information includes all pertinent L2 construction parameters as well as L3 protocol type information for L2/L3 in-line header re-writing operations.

As described above, "in-line" packet processing includes an output component that constructs a new L2 header for a given packet prior to transfer out of the router. Output formatter 314 constructs a new L2 header based on the media header information. In one implementation, the next hop index points to a sequence capable of producing the desired L2 header. The sequence can be of the form of a data structure that includes references to common components of L2 headers which can be stored on-chip in an on-chip template as well as references to specific L2 header templates which are unique to a given next hop index. The unique templates can be stored off-chip in SRAM. Ethernet, Frame Relay, and other L2 header types are created and stored in templates.

The L2 header data structure includes three parts: a program header, L2 header byte generation template and one or more templates. The program header includes flags for initiating error checking functions and is used to define the size of the sequence. Error checking functions include calculating a checksum for the L2 header.

The L2 byte generation template stores flags indicating which bytes of the data structure are generated from internal or external templates.

A template includes instructions for generating particular L2 header data for a given next hop index. In addition to generating a new L2 header based on the next hop index, output formatter 314 can be required to manipulate portions of the L3 header that have been stored along with the packet in packet memory (memory 104 in FIG. 2b). For example, output formatter 314 calculates new checksum data for the L3 header prior to transmission from the router.

Output formatter 314 couples the cell data returned from memory with the appropriate media header (L2 header) to generate a complete packet for transfer out of router 20 on the line output interface 308.

In-Line Packet Processing Overview

Referring now to FIG. 7, in a method for in-line processing packets for routing through a switch, a packet is received at a multi-function multiport (702). Packet headers are pre-processed to the evaluate L2 header data for errors and locate the start of the next layer header (704). L2 header data is conditionally stripped as part of the pre-processing (706). L3 header data is evaluated in parallel for errors (708). The cells are transferred to an input switch (710). Input switch removes the key information from the first cell in a packet and routes the cells to memory banks resident in the multi-function multiports in a time division multiplexed manner (712). The key, full address of the first cell and offset information is transferred as a look-up request to a controller (714). The controller performs a best match look-up and generates a result of the look-up (71). The result includes the destination port (multi-function multiport), address, offset information and next hop index. A notification including the result is transferred to the output switch for transfer to the appropriate multi-function multiport (718).

Upon receipt of a notification, the multi-function multiport generates read requests a cell at a time to the input switch for the data associated with the packet (720). When the memory bank receives the request from the input switch, cell data are transferred to an appropriate multi-function multiport through the output switch (722). Upon receipt, the multi-function multiport constructs a L2 header from templates indicated by the next hop index and modifies the L3 header as appropriate (724). Finally, the cell data and media header information is streamed to the destination (726) and the process ends (728).

The present invention has been described in terms of specific embodiments, which are illustrative of the invention and not to be construed as limiting. Other embodiments are within the scope of the following claims.

What is claimed is:

1. A method, comprising:
    receiving, at a router device, a data packet at a buffer;
    dividing, by the router device, the data packet into cells;
    storing, via the router device, the cells in a first queue, where storing the cells further includes:
        identifying a layer two (L2) header in the data packet,
        removing the L2 header from at least one of the cells prior to storing the at least one of the cells in the first queue,
        transferring data from the buffer in one or more N byte blocks, where N is less than a particular number,
        determining that removing the L2 header would result in a resulting cell having less than the particular number of bytes,
        receiving an additional block of data,
        replacing, in response to determining that removing the L2 header would result in a cell having less than particular number of bytes, the data corresponding to the L2 header with data from the additional block of data sufficient to make the resulting cell have the particular number of bytes, and
        transferring leftover data from the additional block of data to an overflow queue, where the overflow queue is different from first queue; and
    storing, via the router device and for each of the cells, a cell state code that indicates an address of the corresponding cell in the first queue and an indication of a sequence order of the cell within the data packet.

2. The method of claim 1, where each cell comprises a header portion and a payload portion.

3. The method of claim 2, where the header portion comprises 16 bytes of data and the payload portion comprises 64 bytes of data.

4. The method of claim 1, further comprising:
    determining, for each cell to be formed, that data is present in the overflow queue; and
    transferring the data present in the overflow queue to the queue prior to transferring additional cell data from the buffer to the queue, in response to determining that the data is present in the overflow queue.

5. The method of claim 1, where the address of the corresponding cell in the first queue comprises a pointer to a location of the payload portion of the cell in the first queue.

6. The method of claim 1, where the indication of the sequence order of the cell within the packet comprises a code to indicate that the cell is one of a first cell in the data packet, a middle cell in the data packet, or a last cell in the data packet.

7. The method of claim 1, where the cell state code comprises a 10 bit code, where 8 bits are associated with the address and 2 bits are associated with the indication of the sequence order.

8. The method of claim 1, further comprising:
determining whether the first queue includes an available slot prior to storing each cell in the first queue.

9. A device for processing a packet, comprising:
a first queue to store a packet;
a segmentation buffer to receive blocks of data from the first queue;
a cell packetizer to remove layer two (L2) header information associated with the packet from the received blocks of data;
an overflow queue; and
a cell payload queue to receive data from the overflow queue and the cell packetizer, where the data received by the cell payload queue comprises a cell having a predetermined cell size,
where the cell packetizer is further to:
determine an amount of data necessary to replace the removed information,
receive an additional block of data from the queue to replace the removed information,
determine that the amount of data necessary to replace the removed information is less than a size of the block of data,
replace the removed information with data from the additional block of data, and
store any leftover data from the additional block of data not used to replace the removed information in the overflow queue.

10. The device of claim 9, further comprising:
an L2 header parser to identify a location of the L2 header information in the packet and send the location of the L2 header information to the cell packetizer.

11. The device of claim 9, where each block of data comprises a fixed portion of the predetermined cell size.

12. The device of claim 9, where the cell packetizer is further to:
determine that leftover data is present in the overflow queue; and
transfer, when leftover data is present, the leftover data to the cell payload queue prior to receiving data from the segmentation buffer.

13. The device of claim 9, further comprising:
a cell state queue to store, for each cell in cell payload queue, a cell state code that indicates an address of the corresponding cell in the cell payload queue and an indication of a sequence order of the cell within the packet.

14. The device of claim 13, where the indication of the sequence order of the cell within the packet comprises a code that indicates that the cell is one of a first cell in the data packet, a middle cell in the data packet, or a last cell in the data packet.

* * * * *